United States Patent
Iwanami et al.

(10) Patent No.: US 6,804,969 B2
(45) Date of Patent: Oct. 19, 2004

(54) COMPOSITE AUXILIARY MACHINE FOR A VECHILE AND A CONTROL UNIT THEREOF

(75) Inventors: Shigeki Iwanami, Okazaki (JP); Hironori Asa, Okazaki (JP)

(73) Assignees: Nippon Soken, Inc., Nishio (JP); DENSO Corporation, Kariya (JP)

( * ) Notice: Subject to any disclaimer, the term of this patent is extended or adjusted under 35 U.S.C. 154(b) by 0 days.

(21) Appl. No.: 10/417,567

(22) Filed: Apr. 17, 2003

(65) Prior Publication Data
US 2003/0200759 A1 Oct. 30, 2003

(30) Foreign Application Priority Data
Apr. 25, 2002 (JP) ........................................ 2002-124140

(51) Int. Cl.$^7$ ............................. B60H 1/32; F25B 27/00
(52) U.S. Cl. ........................... 62/133; 62/236; 62/323.4
(58) Field of Search ............................... 62/133, 323.4, 62/323.3, 323.1, 228.5, 228.4, 236, 243

(56) References Cited

U.S. PATENT DOCUMENTS

| 6,152,845 | A | * | 11/2000 | Okada et al. | 474/93 |
| 6,332,842 | B1 | * | 12/2001 | Tabuchi et al. | 464/33 |
| 6,351,957 | B2 | * | 3/2002 | Hara | 62/133 |
| 6,640,562 | B2 | * | 11/2003 | Odachi et al. | 62/133 |
| 2001/0027133 | A1 | * | 10/2001 | Kimura et al. | 464/32 |
| 2002/0124580 | A1 | * | 9/2002 | Suitou et al. | 62/133 |
| 2003/0097848 | A1 | * | 5/2003 | Egami | 62/133 |
| 2003/0213252 | A1 | * | 11/2003 | Kuribayashi | 62/133 |

FOREIGN PATENT DOCUMENTS

| JP | 09-324668 | 12/1997 | |
| JP | 2000-130323 | 5/2000 | |
| WO | WO 97/49938 | * 12/1997 | F16H/3/54 |

* cited by examiner

*Primary Examiner*—Marc Norman
(74) *Attorney, Agent, or Firm*—Harness, Dickey & Pierce, PLC

(57) ABSTRACT

A composite auxiliary machine for a vehicle has proper startup performance in starting an engine. The composite auxiliary machine has a compressor for compressing a refrigerant inside a refrigeration cycle device, a rotary machine connected to the compressor and rotated together therewith, a drive pulley for operating the rotary machine in response to a driving force from the vehicle engine, and a clutch device for transmitting and terminating the driving force of the drive pulley. The rotary machine functions as a generator and an electric motor. A variable displacement mechanism is provided in the compressor to vary an amount of discharge per revolution. A control unit controls to engage the clutch device in starting the vehicle engine, and actuates the rotary machine as an electric motor to actuate the vehicle engine. Then, an amount of discharge of a refrigerant is controlled to become smaller than that necessary in the refrigeration cycle device.

8 Claims, 6 Drawing Sheets

DRIVE SPEED

RPM ENGINE

ELECTROMAGNETIC CLUTCH

ROTARY MACHINE

AMOUNT OF DISCHARGE OF COMPRESSOR

COMPOSITE AUXILIARY MACHINE FOR A VECHILE AND A CONTROL UNIT THEREOF

CROSS REFERENCE TO RELATED APPLICATIONS

This application is based upon, claims the benefit of priority of, and incorporates by reference, the contents of Japanese Patent Application No. 2002-124140 filed Apr. 25, 2002.

BACKGROUND OF THE INVENTION

1. Field of the Invention

The present invention relates to a composite auxiliary machine for a vehicle and a control unit thereof suitably applied to a refrigeration cycle device installed in a vehicle with an idling-stop function, which stops the vehicle engine when the vehicle temporarily stops.

2. Description of the Related Art

Vehicles with an idling-stop function have recently appeared on the market to increase vehicular fuel efficiency. Since this type of vehicle stops its engine temporarily when a vehicle makes a temporary stop, a refrigeration cycle device compressor that is driven by the engine, also stops. Thus, the refrigeration cycle device can not operate as a cooling device while the engine is stopped.

In order to solve this problem, Japanese Patent Laid-Open Publication No. Hei 9-324668 discloses composite auxiliary machines in which an engine crank pulley having a crank clutch is connected to a compressor and a rotary machine with a belt. Operation of the compressor and the rotary machine is controlled in accordance with operating conditions of the engine.

To be more specific, the rotary machine functions as both, an electric motor and a generator. When the engine operates, the crank clutch is engaged, so that the driving force of the engine operates the compressor and the rotary machine to carry out cooling operations and electric power generation.

On the other hand, when the engine stops, the crank clutch disengages. Then, the rotary machine is operated as an electric motor to operate the compressor, so that continuous cooling is possible by continuing the cooling operation. Since the rotary machine is also used as a starter, which is the electric motor needed for starting the engine, it is not necessary to install an additional electric motor.

The above-described device has a problem, however, in that the length of the engine becomes long because the engine is equipped with the crank clutch. The long engine makes its installation difficult. Accordingly, a composite auxiliary machine has been considered in which the compressor is directly connected to the rotary machine, and either the compressor or the rotary machine has a clutch function. In this case, however, it is impossible to obtain desirable startup performance, because when the rotary machine is used as an electric starting motor to rotate the engine, the output of the rotary machine decreases under the operational load of the compressor which rotates together with the engine.

SUMMARY OF THE INVENTION

An object of the present invention is to provide a composite auxiliary machine for a vehicle and a corresponding control unit thereof which both have a desirable startup performance when the engine is started.

To achieve the above object, the present invention employs the following technical means. A composite auxiliary machine for a vehicle according to a first aspect of the present invention includes a compressor (140), a rotary machine (130), a drive pulley (110), and intermittent means (120). The compressor (140) compresses a refrigerant inside a refrigeration cycle device (200). The rotary machine (130), functioning as both a generator and an electric motor, is connected to the compressor (140) and rotates together with the compressor (140). The drive pulley (110) rotates in response to a driving force from a vehicle engine (10) to actuate the compressor (140) or the rotary machine (130). The intermittent means (120) is provided between the drive pulley (110) and the compressor (140), or between the drive pulley (110) and the rotary machine (130) to transmit and terminate the driving force of the drive pulley (110). The compressor (140) has a variable displacement mechanism (145, 148) which varies in amount of discharge per revolution.

In the composite auxiliary machine (100) for a vehicle, when the vehicle engine (10) is operated, the engagement of the intermittent means (120) operates both the compressor (140) and the rotary machine (130). When the refrigeration cycle device (200) is driven, the rotary machine (130) functions as the generator.

When the vehicle engine (10) stops, the intermittent means (120) is disengaged. The rotary machine (130) is operated as the electric motor to operate the compressor (140), so that it is possible to continue cooling operations.

When the rotary machine (130) is operated as an electric motor to actuate the vehicle engine (10), the variable displacement mechanism (145, 148) of the compressor (140) decreases its amount of discharge. Thereby, the operational load of the compressor (140) decreases so that it is possible to prevent reduction in the output of the rotary machine (130). In other words, it is possible to obtain the desirable startup performance of the vehicle engine (10). Continuing, it is possible to reduce power consumption of the rotary machine (130) and also to reduce the physical size of the rotary machine.

According to a second aspect of the invention, the variable displacement mechanism (145, 148) can arbitrarily vary the amount of discharge within a range from the maximum amount of discharge of the compressor (140) itself to the minimum amount of discharge, which is almost zero.

Accordingly, it is possible to minimize the operational load of the compressor (140) on the rotary machine (130), since the amount of discharge of the compressor (140) is minimized, almost zero, when the vehicle engine (10) is started.

According to a third aspect of the invention, the drive pulley (110) and the intermittent means (120) are provided on the rotary machine (130), and a limiter mechanism (150) is provided between the compressor (140) and the rotary machine (130) to disengage the connection between the compressor (140) and the rotary machine (130), when the compressor (140) is locked. Accordingly, the vehicle engine (10) and the rotary machine (130) are protected when the compressor (140) is locked. Therefore, functions related to the drive are not impaired.

According to a fourth aspect of the invention, the drive pulley (110) and the intermittent means (120) are provided on the rotary machine (130), and a reduction mechanism (160), which slows down the RPM of the rotary machine (130) and transmits the rotary motion thereof to the compressor (140), is provided between the compressor (140) and the rotary machine (130). Accordingly, the reduction mechanism (160) reduces the RPM of the compressor (140) as compared with that of the rotary machine (130), when the driving force of the engine (10) is transmitted. Therefore, the compressor (140) will have the proper RPM.

According to a fifth aspect of the invention, a dumping section (170) for absorbing the torque fluctuations of the compressor (140) is disposed between the compressor (140) and the rotary machine (130). Thus, it is possible to prevent breakage of the rotary machine (130) by preventing resonance of a rotary machine shaft (132) with the rotary machine (130).

According to a sixth aspect of the present invention, a control unit of a composite auxiliary machine for a vehicle includes the composite auxiliary machine (100) according to any one of the foregoing first to fifth aspects, and control means (180) for controlling the amount of discharge of the compressor (140), the operation of the rotary machine (130), and the engagement and disengagement of the intermittent means (120). When the vehicle engine (10) is started, the control means (180) controls in order to engage the intermittent means (120) and operate the rotary machine (130) as an electric motor for actuating the vehicle engine (10). Also the control means (180) controls in order to make the amount of discharge from the compressor (140) smaller than that necessary in the refrigeration cycle device (200).

According to a seventh aspect of the invention, it is preferable that the amount of discharge described above is reduced to almost zero. Thus, it is possible to obtain the same effect as the first to fifth aspects of the invention described above.

Reference numerals described in each of the above means correspond to the embodiments described in the Detailed Description of the Preferred Embodiments. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
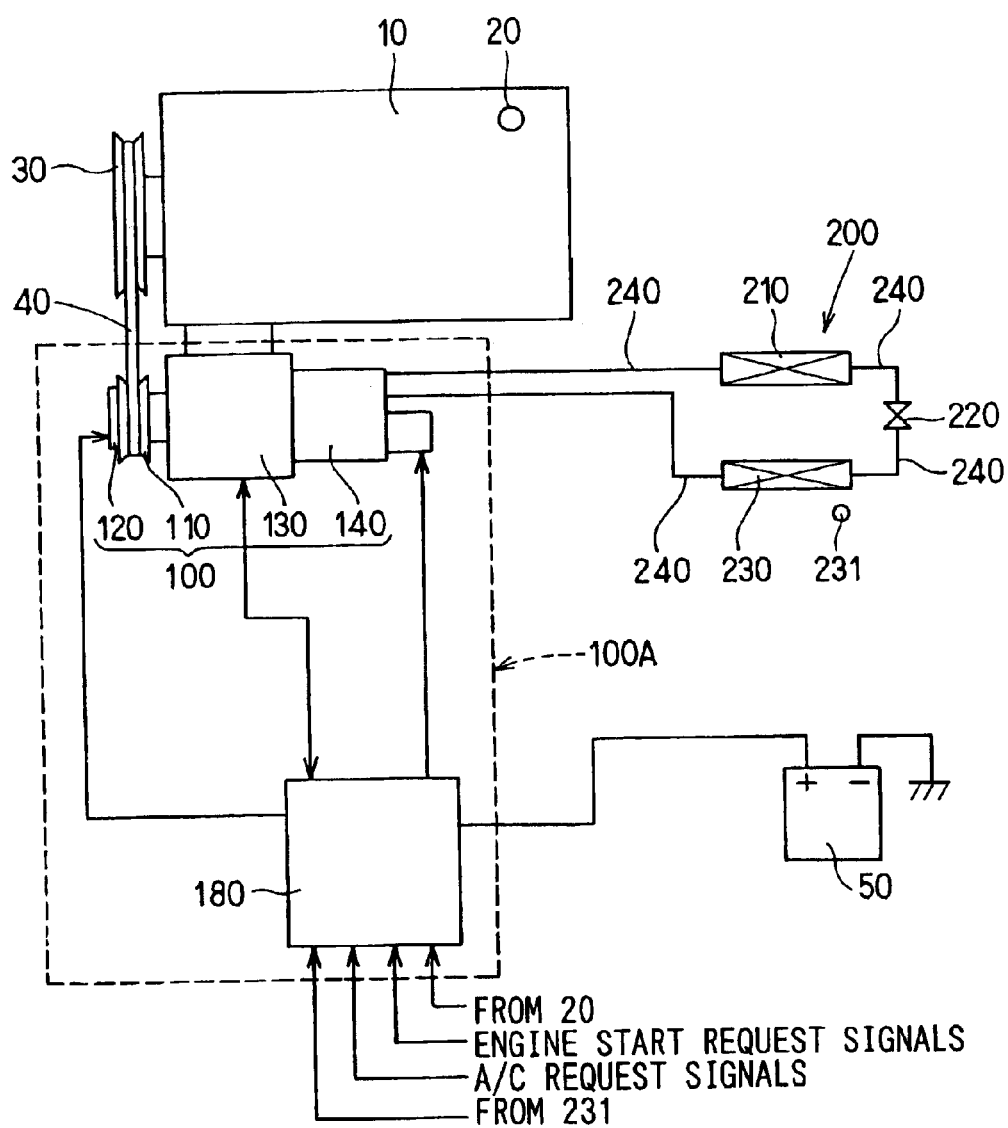
FIG. 1 is a schematic diagram showing a configuration of a composite auxiliary machine which is applied to a refrigeration cycle device of a vehicle with an idling-stop function according to a first embodiment of the invention.

The following description of the preferred embodiment(s) is merely exemplary in nature and is in no way intended to limit the invention, its application, or uses.

(First Embodiment)

FIGS. 1 to 5 show a first embodiment of the present invention. A configuration of a composite auxiliary machine for a vehicle will be hereinafter described with reference to FIGS. 1 and 2.

A control unit 100A for a compressor of an integral-type rotary machine, as a control unit of a composite auxiliary machine for a vehicle according to the present invention, is applied to a refrigeration cycle device 200. The refrigeration cycle device 200 is typically installed in a vehicle with an idling-stop function which stops the vehicle engine 10 (hereinafter, engine) when the vehicle temporarily stops. The compressor control unit 100A comprises a compressor 100 of an integral-type rotary machine as the composite auxiliary machine and a control unit 180 as the control means. The engine 10 is provided with an RPM sensor 20 for detecting the RPM (revolutions per minute) of the engine 10.

The refrigeration cycle device 200 includes a compressor 140 which composes the composite auxiliary machine 100 for a vehicle. The compressor 140 compresses a refrigerant within, that is, inside the refrigeration cycle to a high temperature and pressure. The refrigeration cycle is a closed-circuit which includes a condenser 210 for condensing and liquefying the compressed refrigerant, an expansion valve 220 for adiabatic expansion of the liquefied refrigerant, an evaporator 230 for cooling air passing through the evaporator 230 itself by latent heat generated in vaporizing the expanded refrigerant, and refrigeration pipes 240 sequentially connecting the above units. An evaporator temperature sensor 231 for detecting the temperature of the cooled air (the air temperature Te in a rearward position of the evaporator) is provided on a downstream side of an air flow-through the evaporator 230. The difference between the air temperature Te in the rearward position of the evaporator and a set temperature set by A/C request signals is used as a typical value of a heat load of the refrigeration cycle device 200. The larger the difference between the air temperature Te in the rearward position of the evaporator and the set temperature, the larger the heat load of the refrigeration cycle device 200 becomes, so that a large amount of refrigerant has to be discharged from the compressor 140.

The compressor 100 of the integral-type rotary machine has a drive pulley 110, an electromagnetic clutch 120 as intermittent means, a rotary machine 130 (auxiliary machine), the compressor 140 (auxiliary machine), and the like as a unit. Configuration of such a device will be described in detail with reference to FIG. 2.

The drive pulley 110 having a drive shaft 112 at a center thereof is rotatably held by pulley bearings 111 provided in a rotary machine housing 131. The drive pulley 110 rotates when the driving force of the engine 10 is transmitted to the drive pulley 110 through a crank pulley 30 and a belt 40 (referring to FIG. 1). Bearings 113 hold the drive shaft 112.

The electromagnetic clutch 120 transmits and shuts off the driving force of the engine 10 transmitted from the drive pulley 110 to the rotary machine 130. The electromagnetic clutch 120 has coils 121 fixed in the rotary machine housing 131, and a hub 122 connected to the drive shaft 112 with bolts 114. It is known that when the coils 121 are energized, the drive pulley 110 attracts the hub 122 in order to transmit the driving force of the engine 10, namely the driving force of the drive pulley 110 to the drive shaft 112 (the clutch is ON). On the other hand, when shutting off the energization of the coils 121, the hub 122 moves away from the drive pulley 110, so that the driving force of the drive pulley 110 is not transmitted to the drive shaft 112 (the clutch is OFF).

The rotary machine 130 functions as both a generator and an electric motor (that is, a motor-generator). The rotary machine 130 has stator sections (stators) 135 fixed on the inner surface of the rotary machine housing 131 with wire-wound sections 135a, and rotor sections (rotors) 136 fixed on the rotary machine shaft 132 with permanent magnets 136a on the outer periphery thereof. One end of the rotary machine shaft 132 on a compressor 140 side is held by bearings 133 provided in the rotary machine housing 131, and the other end is connected to the drive shaft 112.

When electric power from a battery 50 (referring to FIG. 1) is supplied to the stator section 135, the rotor section 136 and the rotary machine shaft 132 rotate to actuate the compressor 140 (an electric motor mode). The rotary machine 130 also functions as a starter motor (a starter) to actuate the engine 10 in starting the engine 10 (a starter mode). When both the engine and the clutch are ON, the drive pulley 110 rotates the rotary machine shaft 132 and the rotor section 136. Then, current generated in the stator section 135 charges the battery 50 (generator mode).

The compressor 140 is a variable displacement compressor of a swash plate type that has swash plates 145 and a control valve 148 as a variable displacement mechanism. The compressor 140 varies an amount of discharge thereof, that is, an amount of discharge of the refrigerant per revolution. The amount of discharge of the refrigerant is expressed as the product of the amount of discharge per revolution and the RPM of the compressor 140.

In the compressor 140, a compressor shaft 142 held by bearings 143 and 144 is provided with the swash plates 145 disposed inside a swash plate chamber 145b, and the swash plates 145 are connected to plural pistons 147 via shoes 145a attached on the outer periphery thereof.

Figure 2:
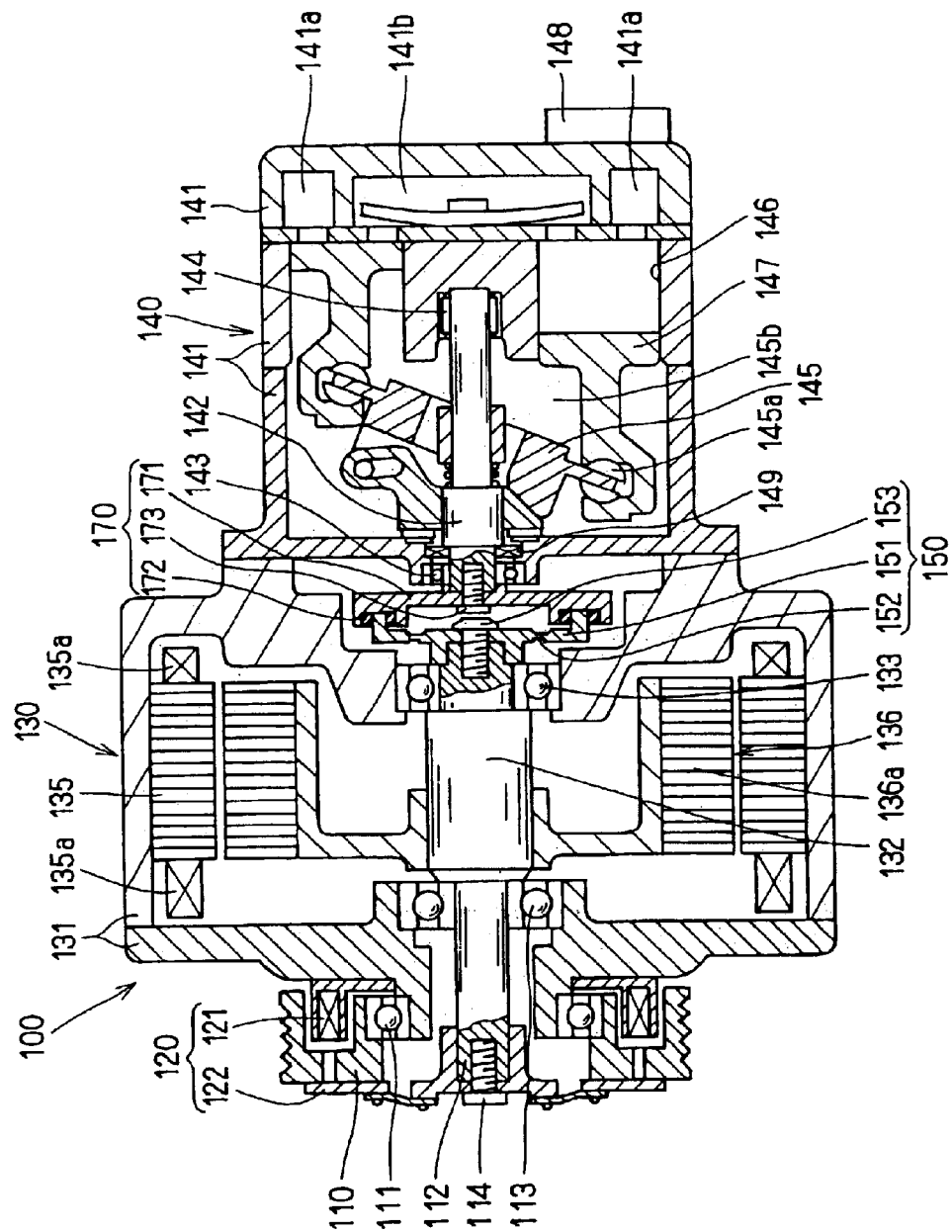
FIG. 2 is a cross-sectional view of a compressor of an integral-type rotary machine as shown in FIG. 1.

A right end of the compressor 140 in FIG. 2 is equipped with the control valve 148. In accordance with the degree of opening of the control valve 148, the pressure of discharge chamber 141b is distributed over the swash plate chamber 145b, or the pressure of the swash plate chamber 145b is discharged into an inhalation chamber 141a in order to adjust the pressure inside the swash plate chamber 145b. The angle of inclination of the swash plates 145 is varied in response to the pressure in the swash plate chamber 145b, and variation of the angle varies the stroke of the pistons 147, so that it is possible to vary the amount of discharge of the refrigerant.

Figure 3:
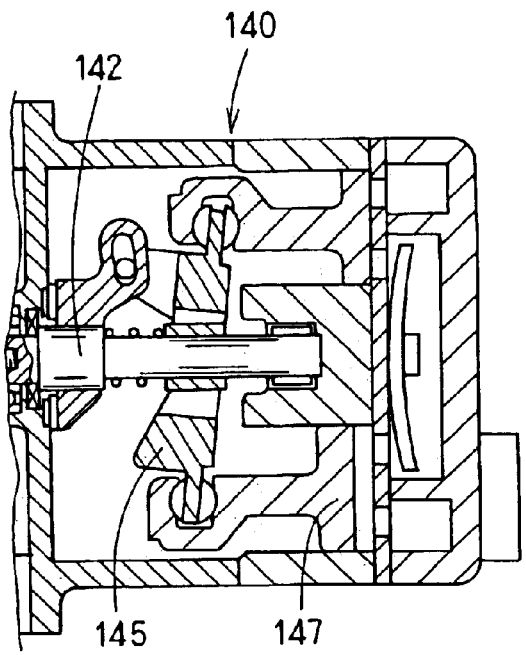
FIG. 3 is a cross-sectional view of a compressor showing swash plates at a minimum angle of inclination (to discharge a minimum amount)

It is possible to continuously vary the angle of inclination of the swash plates 145. In the maximum angle of inclination of the swash plates 145, as shown in FIG. 2, the stroke of the pistons 147 is maximized, and the maximum amount of refrigerant is discharged. On the contrary, when the angle of inclination of the swash plates 145 is minimized (the swash plates 145 are approximately orthogonal to the compressor shaft 142 as shown in FIG. 3), the stroke of the pistons is minimized, and the minimum amount of refrigerant, approximately zero, is discharged.

The rotary machine shaft 132 of the rotary machine 130 and the compressor shaft 142 are connected to each other via a limiter mechanism 150 and a dumping section 170.

The limiter mechanism 150 has thin-walled sections 152 formed in an intermediate portion of a disc member 151 in a radial direction. The limiter mechanism 150 is secured to the rotary machine shaft 132 with a bolt 153. The limiter mechanism 150 breaks the thin-walled sections 152 for itself, when the outer periphery of the disc member 151 is fixed and torque, the value of which is over a predetermined value, is applied to a center thereof (the rotary machine shaft 132).

The dumping section 170 includes a disc member 171, and elastic members 172 made out of gum, for example, and welded on the outer periphery of the disc member 171. The dumping section 170 is secured to the compressor shaft 142 with a bolt 173.

The outer periphery of the disc member 151 of the limiter mechanism 150 is welded on the elastic members 172 of the dumping section 170, so that the rotary machine shaft 132 and the compressor shaft 142 are connected to each other. A shaft seal device 149 is provided on the bearing 143 side of the compressor shaft 142 in order to prevent leaking of the refrigerant inside the compressor 140 from the compressor housing 141 to the rotary machine side 130.

Referring back to FIG. 1, RPM signals from the RPM sensor 20 on the engine 10, engine start request signals, A/C request signals, temperature signals from the evaporator temperature sensor 231 and the like are input to the control unit 180. The control unit 180 judges the heat load of the refrigeration cycle device 200 based on these signals, and judges the drive conditions of the vehicle in order to control the continuation of the electromagnetic clutch 120, the operation of the rotary machine 130, and the amount of discharge of the compressor 140. Control of the control unit 180 and operation of the compressor 100 of the integral-type rotary machine, on the basis of the above-described configuration, will be hereinafter described with reference to a flow chart shown in FIG. 4 and a timing chart shown in FIG. 5.

Figure 4:
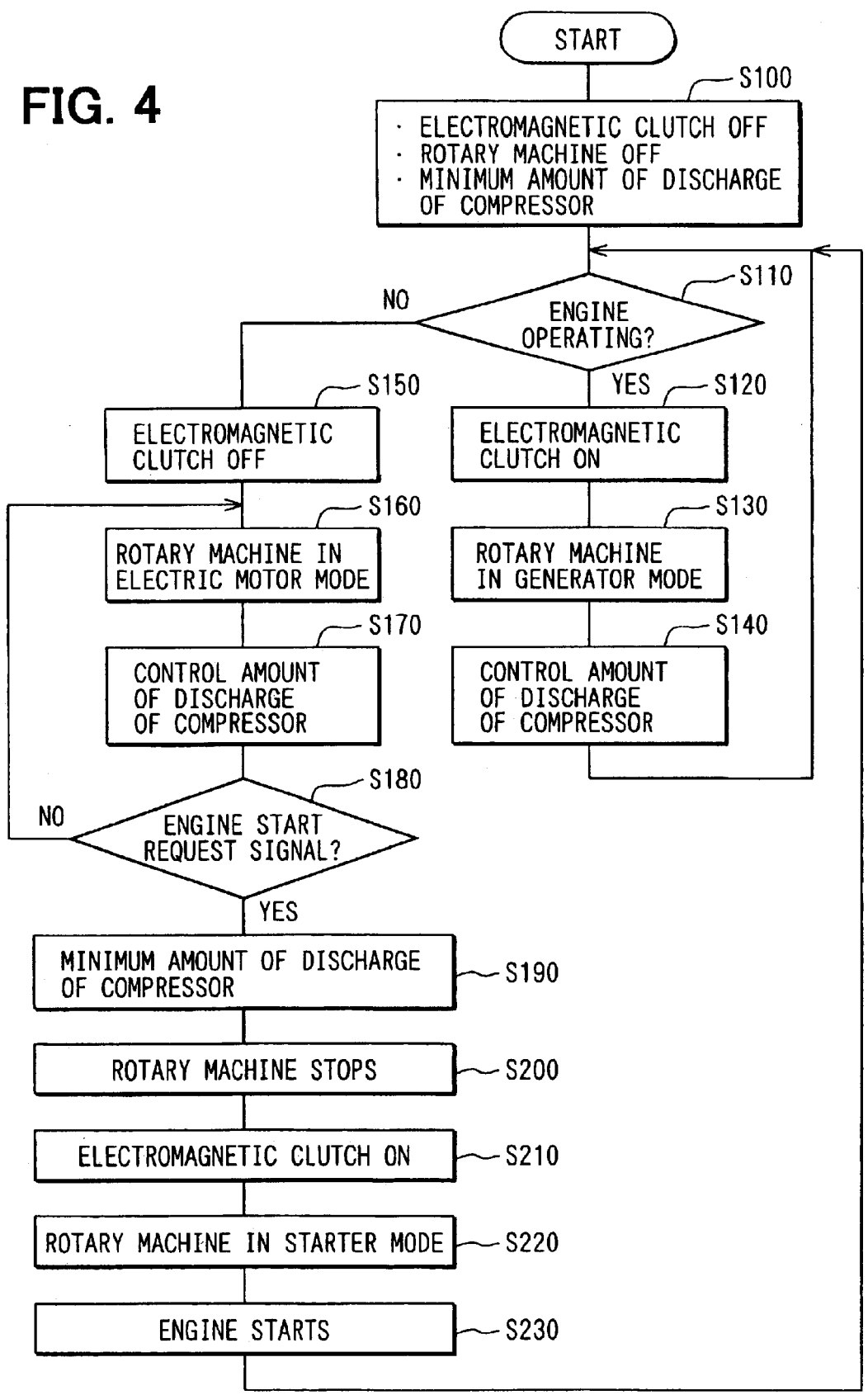
FIG. 4 is a flow chart showing the control steps of the compressor of the integral-type rotary machine.
Figure 5A:
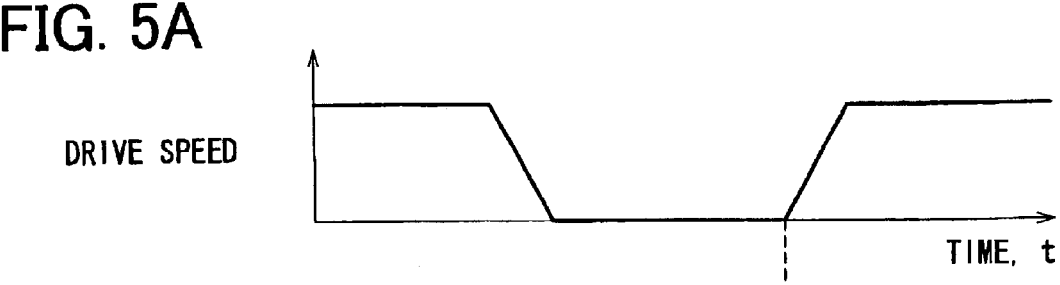
FIG. 5A is a timing chart showing drive speed in operating the compressor of the integral-type rotary machine.
Figure 5B:
FIG. 5B is a timing chart showing RPM of an engine in operating the compressor of the integral-type rotary machine.
Figure 5C:
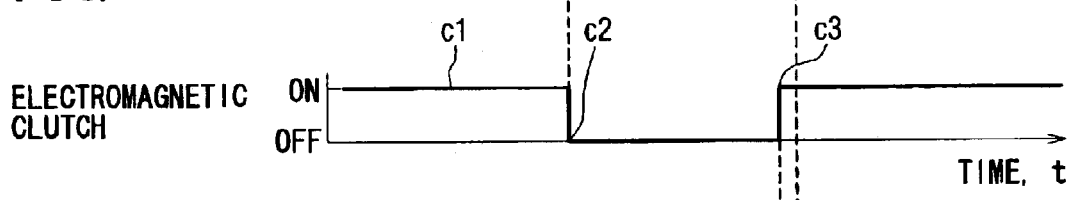
FIG. 5C is a timing chart showing operating conditions of an electromagnetic clutch in operating the compressor of the integral-type rotary machine.
Figure 5D:
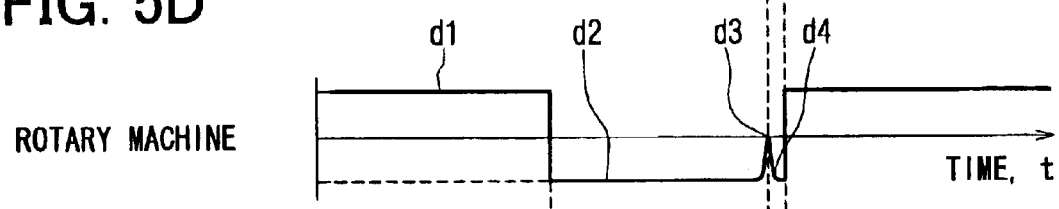
FIG. 5D is a timing chart showing operating conditions of the rotary machine in operating the compressor of the integral-type rotary machine.
Figure 5E:
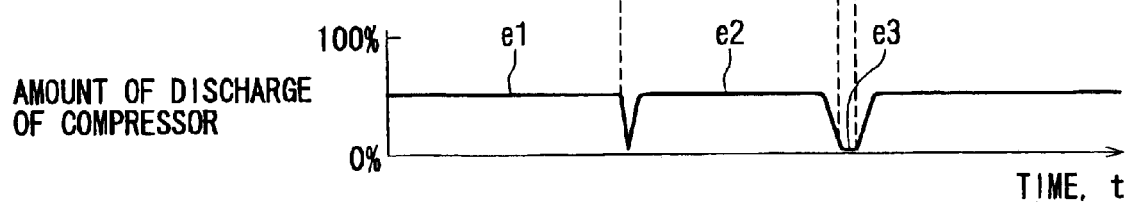
FIG. 5E is a timing chart showing the amount of discharge of the compressor in operating the compressor of the integral-type rotary machine.

At step S100 in FIG. 4, as initial settings, the electromagnetic clutch 120 and the rotary machine 130 are OFF, and the amount of discharge of the compressor 140 is at a minimum (approximately zero).

Then at step S110, whether the engine 10 is operated or not is judged based on the detection signals from the RPM sensor 20. If the engine 10 is operated (the RPM is not zero), the rotary machine 130 and the compressor 140 are operated with the drive force of the engine 10.

Namely, at step S120, the electromagnetic clutch 120 is turned on (c1 in FIG. 5) to transmit the drive force of the engine 10 from the drive pulley 110 to the rotary machine 130 and the compressor 140. At step S130, the rotary machine 130 is operated as the generator (d1 in FIG. 5, the generator mode) to charge the generated electric power into the battery 50.

Then at step S140, the amount of discharge of the refrigerant from the compressor 140 is varied (e1 in FIG. 5). Namely, the degree of opening of the control valve 148 and the angle of inclination of the swash plates 145 are adjusted, and the stroke of the pistons 147 are varied so as to have the necessary amount of refrigerant discharged in accordance with the heat load of the refrigeration cycle device 200. While the engine 10 is operated, the control unit 180 repeats the above steps from S110 to S140.

On the other hand, if the control unit 180 judges NO at step S110, that is, the control unit 180 judges that the engine 10 is stopped by the idling-stop function (the RPM of the engine is zero), the compressor 140 is operated by the rotary machine 130.

Namely, the electromagnetic clutch 120 is turned off (c2 in FIG. 5) at step S150, and the rotary machine 130 is actuated as the electric motor at step S160 (d2 in FIG. 5, the electric motor mode). Namely, the battery 50 energizes the wire-wound section 135a of the stator section 135, so that the rotor section 136 rotates to actuate the compressor 140. Then at step S170, the amount of discharge of the compressor 140 is varied so as to have the necessary amount of refrigerant discharged in accordance with the heat load of the refrigeration cycle device 200, as in the case of the above step S140 (e2 in FIG. 5).

If there is a request to start the engine 10 in response to the engine start request signals during the idling-stop condition, the rotary machine 130 and the compressor 140 are controlled to start the engine 10 at steps from S190 to S230 described hereinafter.

First, the amount of discharge of the compressor 140 is at minimum, approximately zero, (e3 in FIG. 5) at step S190, and the rotary machine 130 temporarily stops at step S200 (d3 in FIG. 5). Then, the electromagnetic clutch 120 is turned on at step S210 (c3 in FIG. 5), and the rotary machine 130 is actuated as the electric motor (starter) at step S220 (d4 in FIG. 5, the starter mode) to start the engine 10 (at step S230). If there is no engine start request signal at step S180, steps S160 and S170 are repeated.

Features of the present invention will be hereinafter described on the basis of the above-mentioned configuration and operation. In the compressor 100 of the integral-type rotary machine and the control unit 100A thereof, when the engine 10 is operated, the electromagnetic clutch 120 is engaged to operate both the compressor 140 and the rotary machine 130. The refrigeration cycle device 200 is also operated, and the rotary machine 130 generates electric power as a generator. When the engine 10 stops the electromagnetic clutch 120 disengages, and the rotary machine 130 is actuated as an electric motor. Therefore, it is possible to continue the cooling operation by means of operating the compressor 140.

In a case where the rotary machine 130 is operated as an electric motor to actuate the engine 10, it is possible to reduce the operation load of the compressor 140, since the variable displacement mechanism 145, 148 of the compressor 140 makes the amount of discharge smaller than that necessary for the refrigeration cycle device 200. Thus, it is possible to prevent reduction in the output of the rotary machine 130. In other words, it is possible to obtain the desirable startup performance of the engine 10. Additionally, it is possible to reduce power consumption of the rotary machine 130 and make it smaller.

In this embodiment, because the minimum amount of discharge is almost zero, the operational load of the compressor 140 on the rotary machine 130 is at a minimum. Since the limiter mechanism 150 is provided between the rotary machine shaft 132 and the compressor shaft 143, when the compressor 140 is locked by any factor during the operation of the compressor 140 by the drive force of the engine 10 or the rotary machine 130, excessive torque applied to the rotary machine shaft 132 will break the thin-walled sections 152 of the limiter mechanism 150 for the purpose of disconnecting the rotary machine shaft 132 from the compressor shaft 142. Thus, the engine 10 and the rotary machine 130 are protected even when the compressor 140 is locked, so that essential driving functions of the vehicle are not impaired.

Since there is the dumping section 170 provided between the rotary machine shaft 132 and the compressor shaft 143, the elastic members 172 absorb the torque fluctuations during the operation of the compressor 140. Thus, resonance in the rotary machine shaft 132 is prevented, so that it is possible to prevent breakage of the rotary machine 130.

(Second Embodiment)

Figure 7:
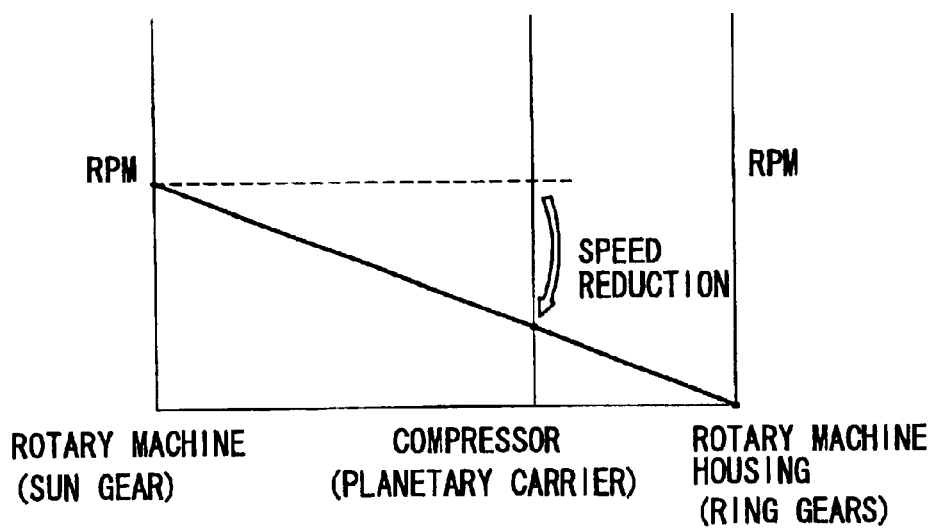
FIG. 7 is a graph showing RPM of a planetary gear train.
Figure 6:
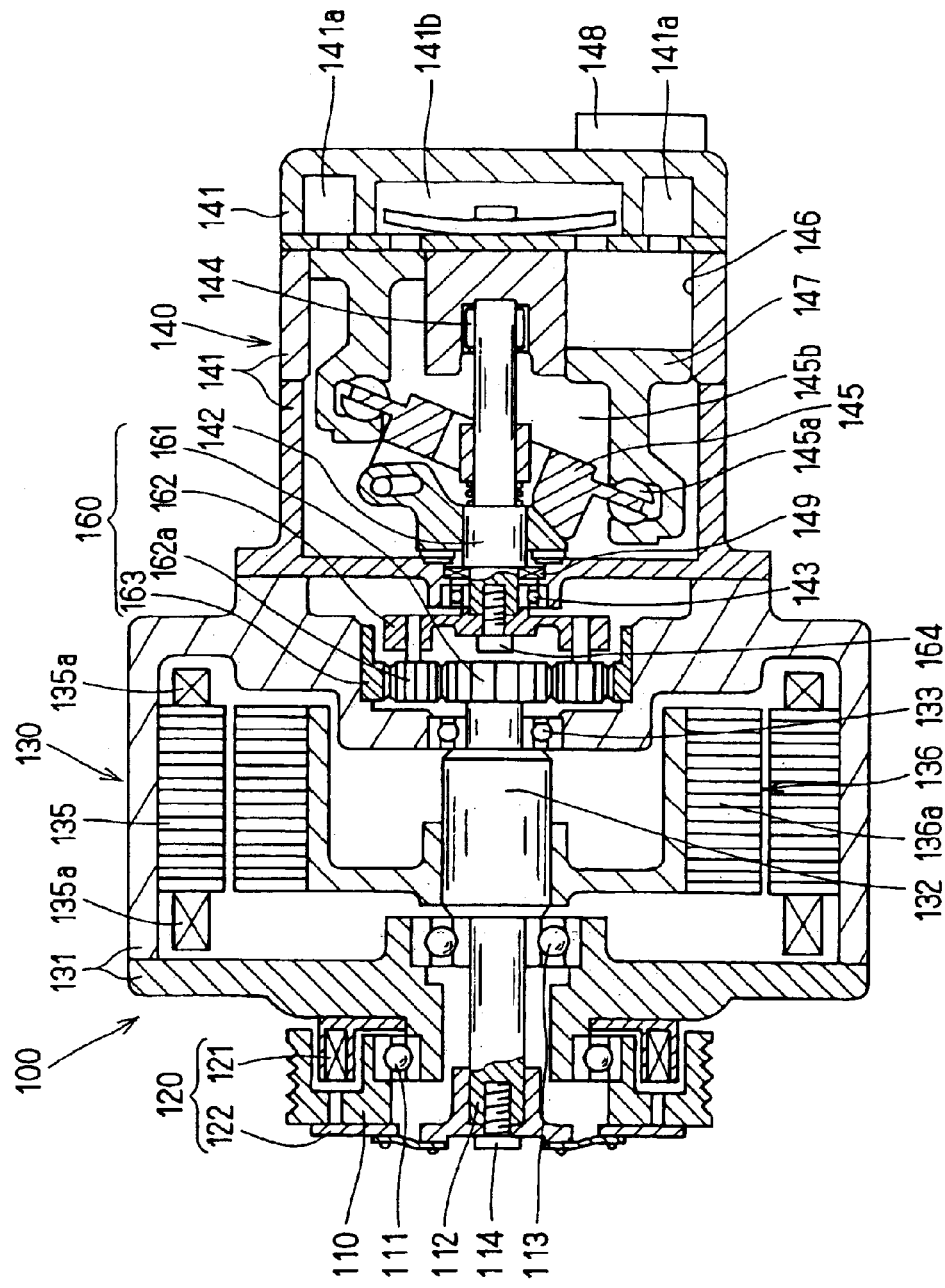
FIG. 6 is a cross-sectional view of a compressor of the integral-type rotary machine according to a second embodiment.

A second embodiment of the present invention will be described with reference to FIGS. 6 and 7. According to the second embodiment, there is provided a reduction mechanism between the rotary machine 130 and the compressor 140 in addition to the configuration according to the first embodiment.

The reduction mechanism uses a planetary gear train 160. The planetary gear train 160, as is commonly known, has a sun gear 161 disposed at a center thereof, a planetary carrier 162 rotated by pinion gears 162a disposed in the outer periphery of the sun gear 161, and a ring gear 163 disposed yet further in the outer periphery of the pinion gears 162a.

The sun gear 161 is secured to the rotary machine shaft 132, and the planetary carrier 162 is secured to the compressor shaft 142 with a bolt 164. The ring gear 163 is secured to the rotary machine housing 131.

The disposition of the planetary gear train 160 between the rotary machine 130 and the compressor 140 makes it possible to reduce the RPM of the rotary machine 130 operated by the drive pulley 110. Then, the rotation is transmitted to the compressor 140. In the planetary gear train 160, as shown in FIG. 7, the RPM of each gear 161 and 163 and carrier 162 is linearly proportional to each coordinate thereof. Since the RPM of the ring gear 163 secured to the rotary machine housing 131 is zero, the RPM of the compressor shaft 142 connected to the planetary carrier 162 is lower than that of the rotary machine shaft 132 connected to the sun gear 161.

In the generator mode, in general, the RPM of the rotary machine 130 is two to three times higher than that of the engine 10. On the contrary, the RPM of the compressor 140 is some one and a half times higher than that of the engine 10 taking into consideration the durability of the compressor 140. Therefore, the compressor 140 has to operate under excessive RPM, in a case where the rotary machine shaft 132 is directly connected to the compressor shaft 142.

In the second embodiment, the reduction mechanism can reduce the RPM of the compressor 140 more as compared with that of the rotary machine 130, when the driving force of the engine 10 is transmitted as described above. When the compressor 140 rotates with the proper RPM, it is possible to secure durability of the compressor 140.

As a combination of the rotary machine shaft 132 and the compressor shaft 142 with respect to the planetary gear train 160, the sun gear 161 may be a fixed gear, and the rotary machine shaft 132 and the compressor shaft 142 may be secured to the ring gear 163 and the planetary carrier 162, respectively. In this case, it is possible to obtain the same effect as stated above.

(Other Embodiments)

In the first embodiment, when the limiter mechanism 150 and the dumping section 170 may not be provided and the rotary machine shaft 132 and the compressor shaft 142 are directly connected to each other, the drive pulley 110 and the electromagnetic clutch 120 may be provided on the compressor 140 to improve upon the flexibility of installation. Further, it is not necessarily required that the amount of discharge of the compressor 140 be as low as zero when starting the engine 10. The amount of discharge of the compressor 140 may be determined by a trade-off between the startup performance of the engine 10 and cooling performance.

The present invention may be applied to a hybrid electric-internal combustion vehicle, in addition to vehicles with the idling-stop function as is described in the above embodiments. Additionally, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. A composite auxiliary machine for a vehicle comprising:
    a compressor for compressing a refrigerant inside a refrigeration cycle device, said compressor having a variable displacement mechanism for varying an amount of discharge of the refrigerant per revolution, wherein said variable displacement mechanism can arbitrarily vary an amount of discharge within a range from a maximum amount of discharge of the compressor itself to a minimum amount of discharge being approximately zero;
    a rotary machine functioning as both a generator and an electric motor, said rotary machine being connected to said compressor and rotating together with said compressor;
    a drive pulley rotating in response to driving force from a vehicle engine to actuate said compressor or said rotary machine; and
    intermittent means provided between said drive pulley and said compressor, or between said drive pulley and said rotary machine to transmit and terminate the driving force of said drive pulley, wherein
    said drive pulley and said intermittent means are provided on said rotary machine, a limiter mechanism is provided between said compressor and said rotary machine to disengage connection between said compressor and said rotary machine when said compressor is locked, and
    said rotary machine is disposed between the drive pulley and the limiter mechanism such that the rotary machine can be rotated by the drive pulley, when the connection between said compressor and said rotary machine is disengaged.

2. The composite auxiliary machine according to claim 1, wherein said drive pulley and said intermittent means are provided on said rotary machine, and
    a reduction mechanism is provided between said compressor and said rotary machine, said reduction mechanism being capable of reducing RPM of said rotary machine and transmitting rotation to said compressor.

3. The composite auxiliary machine according to claim 1, wherein a dumping section for absorbing torque fluctuations of said compressor is disposed between said compressor and said rotary machine.

4. A control unit of a composite auxiliary machine for a vehicle comprising:
    the composite auxiliary machine as set forth in claim 3; and
    control means for controlling an amount of discharge from said compressor, operation of said rotary machine, and engagement and disengagement of said intermittent means, wherein
    said control means controls to engage said intermittent means in starting said vehicle engine, and to operate said rotary machine as an electric motor for the purpose of actuating said vehicle engine, and said control means controls to make the amount of discharge from said compressor smaller than that necessary in said refrigeration cycle device.

5. The control unit according to claim 4, wherein said amount of discharge is reduced to approximately zero.

6. A composite auxiliary machine for a vehicle comprising:
    a compressor for compressing a refrigerant inside a refrigeration cycle device, a rotary machine rotating together with said compressor in response to driving force from a vehicle engine, and
    a limiter mechanism provided between said rotary machine and said compressor, for stopping cooperated rotation between said rotary machine and said compressor when torque applied to the compressor is equal to or higher than a predetermined torque; wherein
    a dumping section for absorbing torque fluctuations of said compressor is disposed between said compressor and said rotary machine; and
    said compressor is a compressor of a variable displacement type, and when starting the engine, the rotary machine is actuated as an electric starter motor, and an amount of discharge from said compressor is reduced by a predetermined amount in order to secure the necessary torque of the rotary machine for starting said engine.

7. The composite auxiliary machine according to claim 6, wherein said limiter mechanism is provided to transmit and terminate the driving force from said vehicle engine.

8. A composite auxiliary machine for a vehicle comprising:
    a compressor for compressing a refrigerant inside a refrigeration cycle device, said compressor having a variable displacement mechanism for varying an amount of discharge of the refrigerant per revolution;
    a rotary machine functioning as both a generator and an electric motor, said rotary machine being connected to said compressor and rotating together with said compressor;
    a drive pulley rotating in response to driving force from a vehicle engine to actuate said compressor or said rotary machine;
    intermittent means provided between said drive pulley and said compressor, or between said drive pulley and said rotary machine to transmit and terminate the driving force of said drive pulley; and
    control means for controlling an amount of discharge from said compressor, operation of said rotary machine, and engagement and disengagement of said intermittent means, wherein
    said control means controls to engage said intermittent means in starting said vehicle engine, and to operate said rotary machine as an electric motor for the purpose of actuating said vehicle engine, and said control means controls to make the amount of discharge from said compressor smaller than that necessary in said refrigeration cycle device.

* * * * *